Patented Jan. 16, 1951

2,538,355

UNITED STATES PATENT OFFICE 2,538,355

2,2'-ALKYLENE BIS-4,6-DIALKYL PHENOLS AS RUBBER STABILIZERS

Arnold R. Davis, Riverside, and Frank A. V. Sullivan, Darien, Conn., assignors to American Cyanamid Company, New York, N. Y., a corporation of Maine No Drawing. Application July 25, 1949, Serial No. 106,736

8 Claims. (Cl. 260—45.95)

This invention is concerned with antioxidants. More particularly, it is concerned with a novel group of alkylene bis dialkyl phenols used as antioxidants in the manufacture of rubber products. Still more specifically, the rubber antioxidants employed in the present invention are 2,2'-methylene-bis-4,6-dialkylphenols.

In the commercial manufacture of various products, it is necessary to include in the formulation, compounds which render the whole resistant to deterioration by the action of oxygen. An excellent illustration is the compounding and vulcanization of rubber. Vulcanized products quickly develop altered properties after exposure to oxygen. The rate of deterioration, of course, is dependent upon the oxygen content of the atmosphere in which they are exposed, the temperature, pressure, the presence or absence of sunlight, and the like.

In the manufacture of rubber as vulcanized products, diarylamines, for example, previously have been considered the most active antioxidants available. Nevertheless, they possess certain other properties which keep them from being accepted as wholly satisfactory despite their antioxidant activity. Typical of the diarylamines used as antioxidants are compounds such as phenyl beta naphthyl amine, heptylated diphenylamine, and the like. Unfortunately, diarylamines useful for the purpose discolor light-colored rubber compositions on exposure to sunlight. This is particularly unfortunate in view of the demand for light-colored and white vulcanized products.

In the past, when this situation has been presented, various phenolic compounds have been used as antioxidants. They do have the desirable property of not causing serious discoloration on exposure to sunlight. On the other hand, as compared with the diarylamines, their antioxidant properties leave much to be desired. As compared with phenyl beta naphthyl amine, for example, their antioxidant activity is rather weak.

There remains, then, a demand for a suitable antioxidant for inclusion in rubber formulations. These compounds should be capable of successfully protecting the vulcanized product from deterioration in the presence of oxygen. At the same time, they should not be compounds which produce undesirable discoloration as the product ages in light. It is, therefore, a principal object of the present invention to develop such compounds and to develop methods for their use.

In general, the desired objects of the present invention have been met by the production and use of a limited group of chemical compounds. Broadly, these compounds may be represented by the type formula

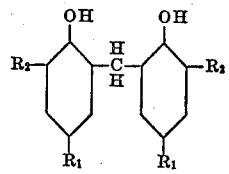

in which formula $R_1$ should be a straight-chain alkyl radical of about 1 to 3 carbon atoms and $R_2$ should be a tertiary alkyl radical of from 4 to about 8 carbon atoms.

As was noted above, it is preferable that $R_2$ be a tertiary alkyl radical. It is essential for the best results, not only that $R_2$ be a tertiary alkyl radical but also that the linkage between the 6-position in the phenol ring and the group designated $R_2$ be to a tertiary carbon in the $R_2$ radical.

At the same time, the compound must meet certain other structural limitations. The phenol rings should be joined through a methylene group. Increasing the size of this group adversely affects the activity of the compound as an antioxidant. Further, the 4-position substitutent must be carefully selected. For example, the presence of a tertiary carbon attached to the phenol ring in this position is undesirable. Such substitution tends to make the compound promote, rather than retard, oxidation. Compounds having a secondary carbon attachment are about neutral, some weakly promoting, some weakly retarding oxidation. A primary carbon in a small alkyl radical, methyl, ethyl, or propyl, is definitely preferred. A methyl radical is most desirable in this position.

It is an advantage of the present invention that the antioxidants therefor may be simply and economically prepared from readily available materials. In general, this is accomplished by reacting a suitably alkylated cresol with formaldehyde and isolating the product. The latter are substantially colorless crystalline solids. By reaction with $CH_2O$, they are converted to the desired antioxidants.

In most cases, suitable alkylated cresols are commercially available, methods for their preparation being known. Where it is desirable or necessary to do so, they may be readily prepared by alkylating a suitable cresol by standard methods. By way of illustration, for example, 4-methyl-6-tertiary butyl phenol may be prepared by alkylating paracresol to introduce the tertiary butyl group in the 2-position. This may be done in any of several ways. One good method is to pass isobutylene into paracresol in the presence of a catalyst such as sulfuric acid or boron fluoride ethereate or a mixture of zinc chloride and phosphoric acid. About five percent of catalyst, based on the expected weight of alkylate, should be used. Reaction is usually initially exothermic but may require mild heating to become complete. Similarly, for example, 2,4-ditertiary butyl phenol may be prepared from phenol and isobutylene and 2-methyl-4-tertiary butyl phenol from orthocresol and isobutylene.

In the following examples, which are given by way of illustration only, preparation of several antioxidants typical of the present invention is shown.

EXAMPLE 1

*2,2'-methylenebis(4,6-dimethylphenol)*

Fifty (50) parts (0.41 mol) of 2,4-dimethylphenol is mixed with 40 parts of concentrated hydrochloric acid containing 14.6 parts (0.40 mol) of hydrogen chloride. 33.2 parts of 36% aqueous formaldehyde solution is added and the reaction mixture heated on a steam bath for two hours. The product agglomerates into an unstirrable mass, necessitating addition of 100 parts of toluene as diluent, and the toluene solution of the product is washed until neutral and chilled in an ice bath. 19 parts (37% yield) of the product, melting at 144° C., crystallizes from the solution. Recrystallization from heptane does not change the melting point of the product.

EXAMPLE 2

*2,2'-methylenebis(4-tertiarybutyl-6-methylphenol)*

105 parts (0.64 mol) of 2-methyl-4-tertiarybutylphenol and 10.5 parts (0.35 mol) of paraformaldehyde are suspended in 125 ml. of heptane and 12 parts of concentrated HCl added. The mixture is stirred overnight at room temperature and then heated to reflux while passing gaseous HCl through the solution, until the water of the reaction has distilled over azeotropically. 60 parts (55% yield) of the product crystallizes from the cold reaction mixture, melting at 112–118° C. Recrystallization from fresh heptane gave a product melting at 126–127° C.

EXAMPLE 3

*2,2'-methylenebis(4,6-ditertiarybutylphenol)*

206 parts (1 mol) of 4,6-ditertiarybutylphenol and 16.5 parts (0.55 mol) of paraformaldehyde were dissolved in 200 ml. of heptane. 10 parts of concentrated HCl is added dropwise to the solution at 20–30° C. and the mixture is stirred overnight. Solids fail to precipitate from the chilled reaction mixture at this point, so the reaction mixture is digested at 50–60° C. for two hours and refluxed at 85° C. for 2.5 hours until the water of reaction has distilled azeotropically. The reaction mixture is then chilled and 50 parts (24% yield) of product, melting at 138–141° C., is crystallized. Recrystallization from fresh heptane gives a product melting at 142–143° C.

EXAMPLE 4

*2,2'-isopropylidenebis(4,6-ditertiarybutylphenol)*

103 parts (0.5 mol) of 2,4-ditertiarybutylphenol and 14.5 parts (0.25 mol) of acetone are mixed without diluent and treated with 21.5 parts of concentrated HCl containing 0.25 mol of hydrogen chloride. The whole is agitated for 70 hours at room temperature, washed with water, neutralized with gaseous ammonia, and again washed until neutral. Addition of solvent heptane is necessary to facilitate washing. Heptane is then stripped from the reaction mixture in vacuo, and the product is distilled in high vacuum. 25 parts (0.12 mol) of 4,6-ditertiarybutylphenol distill from the reaction mixture at 76° C. and 0.03 mm. at a pot temperature up to 96° C. 71 parts (82.5% yield) of crude product is thus obtained as a mahogany-colored viscous liquid which failed to crystallize.

EXAMPLE 5

*2,2'-methylenebis(4-methyl-6-tertiarybutylphenol)*

82 parts (0.5 mol) of 4-methyl-6-tertiarybutylphenol, 10 parts of concentrated HCl, and 0.2 part of Duponol C are charged to a 500 ml. flask, 100 parts of heptane was added, and the contents of the flask agitated while warming to 40° C. 23 parts of 36% aqueous formaldehyde solution, containing 8.25 parts (0.275 mol) of HCHO, are added dropwise so that the temperature does not exceed 60° C. The reaction mixture is digested at 50–60° C. for three hours, cooled at 20° C., and the solid product is collected in a filter. The product is slurried in 500 parts of water containing 20 parts of heptane and 0.25% of Duponol, filtered, and dried. The product weighed 73 g.; M. P., 125–128° C.; yield, 87%. The aqueous layer is separated from the mother liquor and discarded and 15 parts of fresh heptane is added with a fresh charge of 0.5 part of 4-methyl-6-tertiarybutylphenol, 10 parts of concentrated HCl, and 0.2 part of Duponol C. Processing as above, 80 parts of product is obtained; M. P. 123–125° C.; yield, 95%.

It is also an advantage of the present invention that no particular care or precautions need necessarily be taken in making use of these compounds. The antioxidants and materials containing them may be handled in the customary ways. The antioxidant compounds show no undue physiological action on the skin and may be handled freely, a property not possessed by many compounds previously used for this purpose.

Due to their high activity for the purpose, the antioxidants need not be used in more than the customary amounts. In many cases, much smaller amounts than customary may be employed. Amounts ranging from about 0.25 to about 2.5 pounds per 100 pounds of rubber in the formulation produce good results. The average range for most purposes, however, will be about 1.0–1.5 pounds per 100 pounds rubber.

Utilization of the antioxidant materials of the present invention may be carried out in a number of different ways. The antioxidant may be combined with the other materials in the normal manner during compounding. It may be added at any stage in the compounding, although it is generally added fairly early. In addition, the antioxidant materials are soluble in rubber and are particularly advantageous for use in certain other methods which are sometimes used. The antioxidants may be dissolved in a suitable solvent and sprayed or painted on the rubber. An aromatic hydrocarbon solvent, such as benzoyl or toluol, which will penetrate rubber and evaporate, leaving the antioxidant, should be used. Rubber articles may also be preserved by dipping the product in a suitable solution of the antioxidant.

In addition to natural rubbers, treatment of synthetic rubber-like polymers is also contemplated by the present invention. These include, for example, synthetic rubber-like polymers of butadienes-1,3 and copolymers of butadiene-1,3 with other polymerizable compounds. Examples of synthetic rubber-like polymers of butadiene-1,3 or substituted butadiene-1,3 are polymerized butadiene-1,3, methyl-2-butadiene-1,3 (isoprene), chloro-2-butadiene-1,3 (chloroprene), piperylene and 2,3-dimethylbutadiene-1,3. Illustrative copolymers include notably those of a butadiene-1,3 with polymerizable compounds which contain an olefinic (—CH=CH—) group wherein at least one of the disconnected valences is attached to a group which substantially increases the electrical dissymmetry or polar character of the molecule. Examples of such compounds are aryl olefins, such as styrene and vinyl naphthalene; or the alpha methylene carboxylic acids, and their esters, nitriles, and amides, such as acrylic acid, methyl acrylate, methyl methacrylate, acrylonitrile, methacrylonitrile, methacrylamide; isobutylene; methyl vinyl ether; methyl vinyl ketone; and vinylidene chloride. The better-known, commercially-developed synthetic rubbers of the above types are polymerized chloro-2-butadiene-1,3, known as neoprene or GRM rubber; copolymers of butadiene-1,3 and styrene, known as Buna S or GRS rubber; and copolymers of butadiene-1,3 and acrylonitrile, known as Buna N or GRA rubber. The expression, "a rubber," as used herein refers to such natural and artificial rubbers.

Determination of the aging qualities of rubber compositions is not simple. A number of accepted methods are employed. They do not necessarily give identical results. Accordingly, all testing in the present application was done by two of the most commonly used methods. The first of these is the modified Geer Oven Test. In the other, the Bierer and Davis Oxygen Bomb Test was employed.

In the Geer Oven Test, the determination of the aging effect is determined by finding the change in the physical properties of the vulcanized composition after certain periods of exposure, usually 24 to 168 hours or more in a hot oven at a temperature in the range of 70–100° C.

In the Oxygen Bomb Test, the aging effect is determined by measuring the change in physical properties of the vulcanized composition after several definite periods of exposure, usually in multiples of 24 hours, at temperatures in the bomb of 70–80° C. under 300 pounds per square inch oxygen pressure. Both these methods are well known to the rubber chemist and technologist.

In order to illustrate the invention, a number of formulations were prepared, the difference between particular test samples being only in the antioxidant used. The composition is as follows:

| | |
|---|---|
| Pale crepe | 100.0 |
| Stearic acid | 1.0 |
| Zinc oxide | 5.0 |
| Fine precipitated calcium carbonate | 60.0 |
| Titanium dioxide | 20.0 |
| Sulfur | 3.0 |
| Benzothiazyl disulfide | 1.0 |
| Antoxidant | 1.5 |

In each of the following examples, which are also given as illustrative only and not by way of limitation, controls were used. In Control A, no antioxidant was used. In Control B, 1.5 pounds per 100 pounds of rubber of 2,6-di-tertiarybutyl-4-methyl-phenol, a commercially-available phenolic antioxidant, was used. In Control C, 1.5 pounds per 100 pounds of rubber of 2,2'-ethylidene bis (4,6-di-methyl-phenol), another known antioxidant, was used. Except as noted, all parts are by weight. Samples were vulcanized by curing for 10, 20, 30, 40, and 50 minutes at 141° C. The 30-minute cure is approximately optimum for the above composition and test samples cured 30 minutes at 141° C. were used in the examples below.

EXAMPLE 6

A batch of rubber was prepared having the formulations given above. In each of a number of test samples, the antioxidant was varied. The original tensile strength was measured. The samples were exposed in the Geer Oven Test for 48 hours at 100° C. and the tensile strength again measured. For purposes of comparison, the original and after-treatment tensile strengths, as well as the percent of the original strength retained, is shown. The best results are indicated by the highest retention of tensile strength after treatment. Test results are shown in the following table:

Table I

| Antioxidant | | Oven Aging Tests | | |
|---|---|---|---|---|
| $R_1$ | $R_2$ | Original Tensile Strength, Pounds Sq. In. | Final Tensile Strength, Pounds Sq. In. | Per Cent Original Tensile Strength Retained |
| Control A | | 3,365 | 1,610 | 47.7 |
| Control B | | 3,310 | 1,725 | 52.2 |
| methyl | methyl | 3,275 | 1,725 | 63.5 |
| Do | tert.-butyl | 3,390 | 2,550 | 75.2 |

From the foregoing test, the clear superiority of the 4-methyl and 6-tertiary butyl combination is clearly apparent. For purposes of illustration, this is confirmed by the results obtained in the oxygen bomb test, as shown in the following example.

EXAMPLE 7

The procedure of Example 6 was repeated on another portion of the same rubber, except that aging was carried out in a Bierer and Davis Oxygen Bomb. An exposure period of 96 hours at 70° C. and 300 pounds per square inch of oxygen pressure was used. Illustrative results are shown in the following Table II.

Table II

| Antioxidant | | Oxygen Bomb Tests (30 Minutes Cure at 141° C.) | | |
|---|---|---|---|---|
| $R_1$ | $R_2$ | Original Tensile Strength, Pounds Sq. In. | Tensile After 96 Hours in Bomb, at 70° C. | Per Cent Original Tensile Strength Retained |
| Control A | | 3,365 | 2,150 | 63.7 |
| Control B | | 3,310 | 2,550 | 77.0 |
| methyl | tert.-butyl | 3,390 | 3,050 | 90.0 |
| Do | methyl | 3,275 | 2,750 | 84.5 |
| tert.-butyl | tert.-butyl | 3,350 | 950 | 28.4 |
| Do | methyl | 3,300 | 1,525 | 46.2 |

In addition to confirming the results obtained in the Oven Test of Example 6, the results obtained in this test show that by substituting a tertiary carbon radical in the 4- position, the rate of oxidation is increased over that where no antioxidant is present (Control A).

EXAMPLE 8

In order to show the desirability of a small open chain alkyl group in the 4- position, as well as increasing the length of the chain in the 6- position, Example 7 was repeated on another sample of rubber using several additional materials as antioxidants. The materials used and the results obtained are shown below in Table III.

Table III

| Antioxidant | | Oxygen Bomb Tests (30 Minutes Cure at 141° C.) | | |
|---|---|---|---|---|
| (structure with OH, $R_2$, CH$_2$, $R_2$, $R_1$, $R_1$) | | Original Tensile Strength, Pounds Sq. In. | Tensile After 96 Hours in Bomb, at 70° C. | Per Cent Original Tensile Strength Retained |
| $R_1$ | $R_2$ | | | |
| Control A | | 3,225 | 2,225 | 69 |
| methyl | tert.-butyl | 3,350 | 3,050 | 91 |
| Do | tert.-octyl | 3,525 | 2,960 | 84 |
| ethyl | tert.-butyl | 3,550 | 2,825 | 80 |
| isopropyl | do | 3,525 | 2,300 | 65 |

It will be readily seen that the order of activity as an antioxidant decreases with the increasing length of the chain in the 4- position. Increasing the size of the tertiary carbon substituent in the 6- position, however, produces much less change. A secondary carbon in the 4- position produces in this case a practically inactive compound.

Another method, more convenient and precise for studying the relative performance of antioxidants is the "Hot Creep" test in which deformation after a time period when loaded under temperature is measured. One such procedure is described by M. C. Throdahl in "Aging of Elastomers" published in "Industrial and Engineering Chemistry," vol. 40, No. 11, pages 2180–2184, November 1948. The lowest percentage of creep indicates the best aging. A modification of this method was used to study the comparative effectiveness of the compounds shown in Table IV. In this modification, standard dumb-bell tensile strength specimens are used.

EXAMPLE 9

In order to show the comparative results obtained in the "Hot Creep Test," the same base rubber composition was used as was used for the preceding conventional oxygen bomb aging test. It will be seen that the results obtained confirm those obtained in the preceding examples. In addition, a comparison is made with (1) another known antioxidant (Control C); (2) with a compound in which the bis-structure is absent; and (3) with compounds in addition to Control C in which larger groups are used to connect the two phenol rings.

Table IV

| Antioxidant | | | Per cent of "Creep" after 48 hours at 100° C. |
|---|---|---|---|
| (structure with OH, $R_2$, $R_3$, $R_2$, OH, $R_1$, $R_1$) | | | |
| $R_3$ | $R_1$ | $R_2$ | |
| Control A | | | 30.2 |
| Control C | | | 22.6 |
| methylene | methyl | tert.-butyl | 11.3 |
| Do | do | tert.-octyl | 15.1 |
| ethylidene | do | tert.-butyl | 23.1 |
| isopropylidene | do | do | 26.4 |
| benzylidene | do | do | 28.3 |
| 2,4-dimethyl-6-tertiary-butyl phenol | | | 34.0 |

EXAMPLE 10

In order to show the effectiveness of the antioxidants of the present invention in actual aging tests, samples of the same composition used in Example 8 were prepared, vulcanized and aged for five months. A Hot Creep Test was now used on this sample as in Example 9. The results are shown in Table V.

Table V

| Antioxidant | | | Per cent of "Creep" after 48 hours, at 100° C. |
|---|---|---|---|
| (structure with OH, $R_2$, CH$_2$, $R_2$, OH, $R_1$, $R_1$) | | | |
| $R_3$ | $R_1$ | $R_2$ | |
| Control A | | | 132 |
| Control B | | | 88 |
| methylene | tert.-butyl | tert.-butyl | 54 |
| Do | methyl | do | 14 |

It may be seen that the antioxidant of the present invention has retained substantially its original resistance, whereas the sample containing no antioxidant (Control A) is in very poor condition, and the sample containing the commercial hindered phenol type of antioxidant (Control B) is substantially as poor as that containing no antioxidant.

We claim:

1. A method of reducing the normal rate of oxidation of a vulcanized rubber composition with substantially no increase in its susceptibility to discoloration in light, which comprises combining with a vulcanizable rubber composition from about 0.25–2.5 pounds per 100 pounds of rubber of a compound of the formula

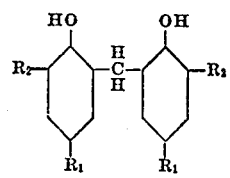

wherein $R_1$ is an n-alkyl radical of 1–3 carbon atoms and $R_2$ is a tertiary alkyl radical of from 4 to about 8 carbon atoms, the bond from the ring structure being to the tertiary carbon atom and vulcanizing said composition.

2. A method of reducing the susceptibility of a vulcanized rubber composition to oxidation with substantially no increase in its susceptibility to discoloration in light, which comprises adding to an unvulcanized rubber composition 0.25-2.5 pounds per 100 pounds of rubber of a compound of the formula

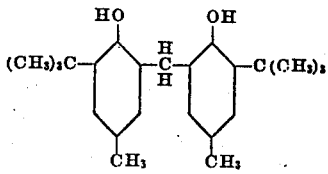

and vulcanizing said composition.

3. A method of reducing the susceptibility of a vulcanized rubber composition to oxidation with substantially no increase in its susceptibility to discoloration in light, which comprises adding to an unvulcanized rubber composition 0.25-2.5 pounds per 100 pounds of rubber of a compound of the formula

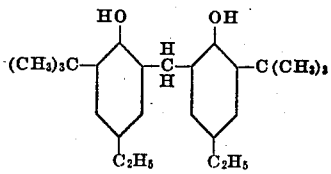

and vulcanizing said composition.

4. A method of reducing the susceptibility of a vulcanized rubber composition to oxidation with substantially no increase in its susceptibility to discoloration in light, which comprises adding to an unvulcanized rubber composition 0.25-2.5 pounds per 100 pounds of rubber of a compound of the formula

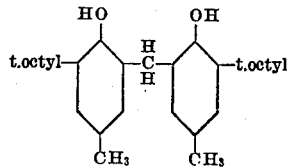

and vulcanizing said composition.

5. A vulcanized rubber composition containing in the rubber hydrocarbon 0.25-2.5 pounds per 100 pounds of rubber of a compound of the formula

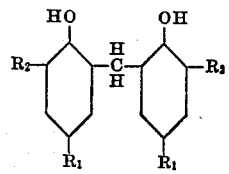

wherein $R_1$ is an n-alkyl radical of 1-3 carbon atoms and $R_2$ is a tertiary alkyl radical of from 4 to about 8 carbon atoms, the bond from the ring structure being to the tertiary carbon atom, characterized by a marked lowering of the rate of oxidation from the rate for a similar composition from which the compound is omitted.

6. A vulcanized rubber composition containing in the rubber hydrocarbon 0.25-2.5 pounds per 100 pounds of rubber of a compound of the formula

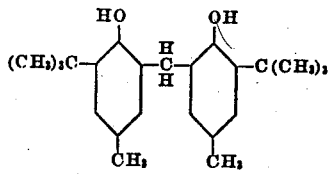

characterized by a marked lowering of the rate of oxidation from the rate for a similar composition from which the compound is omitted.

7. A vulcanized rubber composition containing in the rubber hydrocarbon 0.25-2.5 pounds per 100 pounds of rubber of a compound of the formula

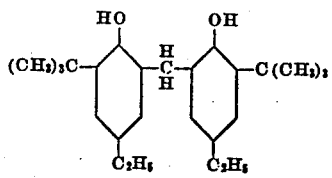

characterized by a marked lowering of the rate of oxidation from the rate for a similar composition from which the compound is omitted.

8. A vulcanized rubber composition containing in the rubber hydrocarbon 0.25-2.5 pounds per 100 pounds of rubber of a compound of the formula

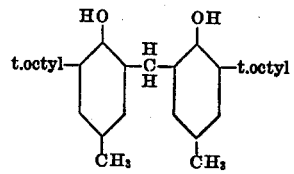

characterized by a marked lowering of the rate of oxidation from the rate for a similar composition from which the compound is omitted.

ARNOLD R. DAVIS.
FRANK A. V. SULLIVAN.

REFERENCES CITED

The following references are of record in the file of this patent:

UNITED STATES PATENTS

| Number | Name | Date |
|---|---|---|
| 1,841,342 | Teppema | Jan. 12, 1932 |
| 1,989,788 | Calcott et al. | Feb. 5, 1935 |
| 2,052,860 | Wilson | Sept. 1, 1936 |
| 2,181,823 | Stevens et al. | Nov. 28, 1939 |
| 2,279,973 | Dietrich | Apr. 14, 1942 |
| 2,356,929 | Hart | Aug. 29, 1944 |
| 2,476,833 | Albert | July 19, 1949 |
| 2,514,209 | Ambelang | July 4, 1950 |